(12) United States Patent  (10) Patent No.: US 7,508,319 B2
Kagan  (45) Date of Patent: *Mar. 24, 2009

(54) METER WITH IRDA PORT

(75) Inventor: Erran Kagan, Great Neck, NY (US)

(73) Assignee: Electro Industries/Gauge Tech, Westbury, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 11/891,197

(22) Filed: Aug. 9, 2007

(65) Prior Publication Data

US 2008/0030368 A1  Feb. 7, 2008

Related U.S. Application Data

(63) Continuation of application No. 10/146,339, filed on May 15, 2002, now Pat. No. 7,256,709.

(60) Provisional application No. 60/369,188, filed on Apr. 1, 2002.

(51) Int. Cl.
G08B 23/00 (2006.01)

(52) U.S. Cl. .................. 340/870.02; 702/61; 702/62

(58) Field of Classification Search ................
340/870.02–870.11, 870.17; 702/61, 62, 702/127
See application file for complete search history.

(56) References Cited

U.S. PATENT DOCUMENTS

| | | |
|---|---|---|
| 5,448,229 A | 9/1995 | Lee, Jr. |
| 5,508,836 A | 4/1996 | DeCaro et al. |
| 5,631,636 A | 5/1997 | Bane |
| 5,793,630 A | 8/1998 | Theimer et al. |
| 5,794,164 A | 8/1998 | Beckert et al. |
| 5,986,574 A | 11/1999 | Colton |
| 6,104,512 A | 8/2000 | Batey et al. |
| 6,111,522 A | 8/2000 | Hiltz et al. |
| 6,150,955 A | 11/2000 | Tracy et al. |
| 6,195,018 B1 | 2/2001 | Ragle et al. |
| 6,239,722 B1 | 5/2001 | Colton et al. |
| 6,262,672 B1 | 7/2001 | Brooksby et al. |
| 6,297,802 B1 | 10/2001 | Fujioka |
| 6,360,090 B1 | 3/2002 | Holcombe et al. |
| 6,405,049 B2 | 6/2002 | Herrod et al. |
| 6,633,825 B2 | 10/2003 | Burns et al. |
| 6,710,721 B1 | 3/2004 | Holowick |
| 6,735,535 B1 | 5/2004 | Kagan et al. |
| 6,751,563 B2 | 6/2004 | Spanier et al. |
| 6,785,620 B2 | 8/2004 | Kishlock et al. |

(Continued)

Primary Examiner—Timothy Edwards, Jr.
(74) Attorney, Agent, or Firm—Gerald E. Hespos; Anthony J. Casella; Michael J. Porco

(57) ABSTRACT

A meter is provided of the type used for recording data primarily related to power and/or energy use. The meter includes an IrDA port for wirelessly transmitting and receiving data to and from the meter. Preferably, the IrDA port operates according to one or more of the standard IrDA protocols and is preferably mounted on the face of the meter to allow data to be read using a handheld computing device. Upon the detection of the handheld computing device, the IrDA port automatically transmits data to the handheld computing device. The handheld computing device is preferably programmed with application software for processing the read data. The processed data can then be transmitted either wirelessly or non-wirelessly to a computing device, such as a remote server or personal computer, for preparing bills, statistical charts, energy reports, etc.

26 Claims, 3 Drawing Sheets

U.S. PATENT DOCUMENTS 7,256,709 B2 * 8/2007 Kagan .................. 340/870.02
2002/0083121 A1 6/2002 Chang et al.
2005/0206530 A1 9/2005 Cumming et al.

* cited by examiner

METER WITH IRDA PORT

PRIORITY

The present application is a continuation application of U.S. application Ser. No. 10/146,339, filed May 15, 2002 entitled "Meter with IrDA Port", which claims priority to a U.S. Provisional Application filed by Erran Kagan on Apr. 1, 2002 titled "Meter with IrDA Port" and assigned U.S. Provisional Application Ser. No. 60/369,188, the entire contents of which are incorporated herein by reference.

FIELD OF THE INVENTION

This invention relates to meters, and more particularly, to a meter having an Infrared Data Association (IrDA) port.

BACKGROUND OF THE INVENTION

IrDA is a standard defined by the IrDA consortium. It specifies a way to wirelessly transfer data via infrared radiation. The IrDA specifications include standards for both the physical devices and the protocols they use to communicate with each other. The IrDA standards have arised from the need to connect various mobile devices together as shown by FIG. 1.

IrDA devices communicate using infrared LEDs. The wavelength used is typically 875 nm. IrDA devices conforming to standards IrDA versions 1.0 and 1.1 work over distances up to 1.0 m with a bit error ratio of $10^{-9}$ and maximum level of surrounding illumination 10 klux (daylight). Speeds for IrDA version 1.0 range from 2400 to 115200 kbps. IrDA version 1.1 defines speeds 0.576 and 1.152 Mbps, with ¼ mark-to-space ratio. At these speeds, the basic unit (packet) is transmitted synchronously.

A packet consists of two start words followed by target address (IrDA devices are assigned numbers by the means of IrDA protocol, so they are able to unambiguously identify themselves), data, CRC-16 and a stop word. The whole packet (frame) including CRC-16 is generated by IrDA compatible chipset.

For 4 Mbps speed, so-called 4 PPM modulation with ¼ mark-to-space ratio is used. Two bits are encoded in a pulse within one of the four possible positions in time. So, information is carried by the pulse position, instead of pulse existence as in previous modulations. For example, bits "00" would be transmitted as a sequence "1000" (flash-nothing-nothing-nothing), bits "01" would be "0100", bit "11" would be sent as "0001".

The main reason for the 4 PPM modulation is the fact, that only half of the LED flashes are needed than in previous modulations; so, data can be transferred two times faster. Also, it is easier for the receiver to maintain the level of surrounding illumination, since a constant number of pulses are received within a given time.

With bit speed of 4 Mbps, the transmitter flashes at 2 MHz rate. However, unlike 0.576 and 1.152 Mbps, 4 Mbps packets use CRC-32 correction code. Most chipsets which can use this modulation can also generate CRC-32 by themselves, and check it when receiving.

An IrDA receiver needs a way to distinguish between the surrounding illumination, noise, and received signal. For this purpose, it is generally useful to use the highest possible output power, since higher power causes a higher current in the receiver which means a better signal-to-noise ratio. However, IR-LEDs cannot transmit at full power continuously over 100% of the time. So, a pulse width of only 3/16 or ¼ (mark-to-space ratio) of the total time for one bit is generally used. Hence, the power can now be up to four or five times the possible maximum power for LEDs shining continuously. Additionally, the transmission path does not carry the dc component, thus it is necessary to use pulse modulation when transmitting.

Several standard protocols used by IrDA devices include IrDA Infrared Link Access Protocol (IrLAP), IrDA fared Link Management Protocol (IrLMP); IrDA Transport Protocols (Tiny TP), IrDA Object Exchange Protocol (IrOBEX), Extensions to IrOBEX for Ir Mobile Communications, and IrTran-P (Infrared Transfer Picture) Specification.

Therefore, it is an aspect of the invention to use IrDA technology to wirelessly transmit and receive data to and from a meter, such as a power and/or energy meter for switchboard and billing applications. These meters are generally mounted at a customer location, on an industrial switchboard panel, and on a utility substation. Data is collected from these meters by a meter reader who takes the data off the meter and writes the data on paper. The data is then entered into a billing or energy management software application.

Data can also be read by a serial or Ethernet connection. However, many of the above-mentioned locations do not have this type of capability. Data can also be read by hard-wiring a mobile computing device to the meter. However, this requires the meter reader to physically locate a connection port and connect wires, thereby making the meter reading process time-consuming.

SUMMARY

A meter is provided of the type used for recording data primarily related to power and/or energy use. The meter includes an IrDA port for wirelessly transmitting and receiving data to and from the meter. Preferably, the IrDA port operates according to one or more of the standard IrDA protocols, such as IrDA Infrared Link Access Protocol (IrLAP), IrDA Infrared Link Management Protocol (IrLMP), IrDA Transport Protocols (Tiny TP), IrDA Object Exchange Protocol (IrOBEX), Extensions to IrOBEX for Ir Mobile Communications, and IrTran-P (Infrared Transfer Picture) Specification.

Preferably, the IrDA port transmits and receives data according to speeds defined for the IrDA version 1.0, i.e., 2400 to 115200 kbps, and speeds defined by the IrDA version 1.1, i.e., speeds of 0.576 and 1.152 Mbps, with ¼ mark-to-space ratio. The IrDA port can also operate at a speed of 4 Mbps, i.e., 4 PPM modulation with ¼ mark-to-space ratio. Also, the IrDA port preferably uses a pulse width of only 3/16 or ¼ (mark-to-space ratio) of the total time for one bit.

The IrDA port is preferably mounted on the face of the meter to allow data to be read using a handheld computing device. The IrDA port preferably includes components as known in the art, such as a transmitter, a receiver, and a processor storing programmable instructions.

The IrDA port automatically recognizes the presence of the handheld computing device by intermittently transmitting an optical pulse. If the optical pulse is picked up by the handheld computing device, the handheld computing device transmits an acknowledgment pulse. The IrDA port then transmits and receives data to and from the handheld computing device.

The handheld computing device is preferably programmed with application software for processing the read data. The processed data can then be transmitted either wirelessly or non-wirelessly to a computing device, such as a remote server or personal computer, for preparing bills, statistical charts, energy reports, etc. Alternatively, the handheld computing device stores the read data for transmission to another computing device, such as a server or a personal computer, at a later time. Data can also be transmitted from the handheld computing device to the IrDA port, such as to re-program and configure the meter. The handheld computing device is preferably the Palm Pilot™ available from 3Com Corporation using the Windows CE™ operating system.

BRIEF DESCRIPTION OF THE DRAWINGS

Various embodiments of the meter with IrDA port of the invention will be described hereinbelow with reference to the drawings wherein.

DETAILED DESCRIPTION OF A PREFERRED EMBODIMENT

Figure 1:
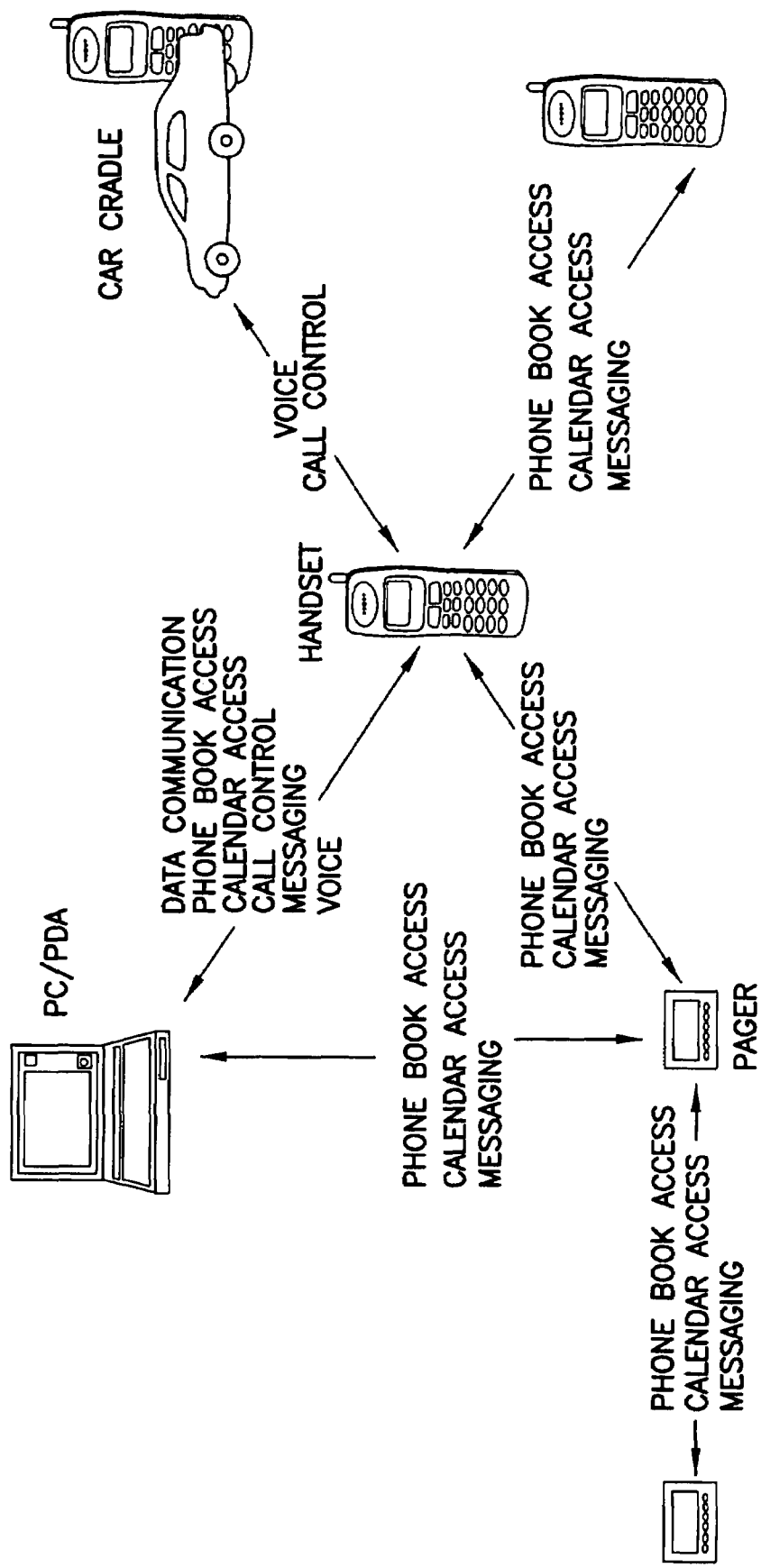
FIG. 1 is a diagram showing prior art uses of IrDA technology.
Figure 2:
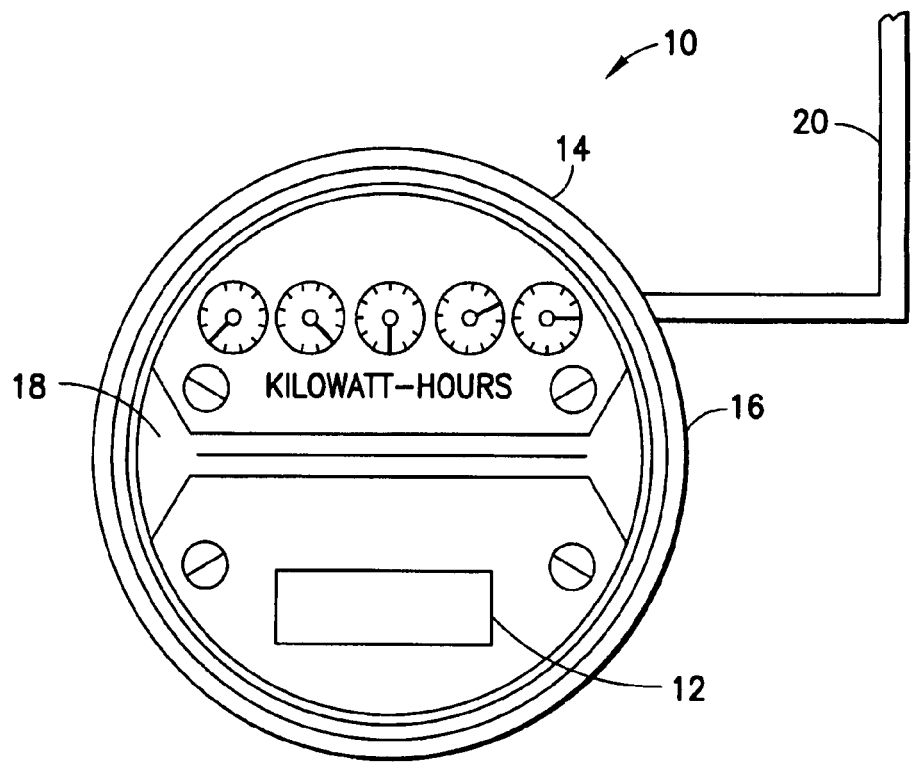
FIG. 2 is a front planar view of a meter having an IrDA port in accordance with the invention.

Referring now to the drawings wherein like reference numerals identify similar structural elements, there is illustrated in FIG. 2 a meter constructed in accordance with a preferred embodiment and designated generally by reference numeral 10. The meter 10 is preferably of the type for measuring power and/or energy use, such as an electric current meter. However, other types of meters, such as gas, oil, pressure, and water measuring meters, are contemplated within the scope of the invention.

The meter 10 includes an IrDA port 12 having components as known in the art for wirelessly transmitting and receiving data to and from the meter 10. The meter 10 also includes other components, such as a mechanical or digital dial 14 for noting, for example, kilowatt hours, a glass housing 16, a rotating wheel 18 below the dial 14, and a power line 20 for powering the meter 10.

Preferably, the IrDA port 12 operates according to one or more of the standard IrDA protocols, such as IrDA Infrared Link Access Protocol (IrLAP), IrDA Infrared Link Management Protocol (IrLMP), IrDA Transport Protocols (Tiny TP), IrDA Object Exchange Protocol (IrOBEX), Extensions to IrOBEX for Ir Mobile Communications, and IrTran-P (Infrared Transfer Picture) Specification.

The IrDA port 12 preferably transmits and receives data according to speeds defined for the IrDA version 1.0, i.e., 2400 to 115200 kbps, and speeds defined by the IrDA version 1.1, i.e., speeds of 0.576 and 1.152 Mbps, with ¼ mark-to-space ratio. The IrDA port 12 can also operate at a speed of 4 Mbps, i.e., 4 PPM modulation with ¼ mark-to-space ratio. Also, the IrDA port 12 preferably uses a pulse width of only 3/16 or ¼ (mark-to-space ratio) of the total time for one bit.

Figure 3:
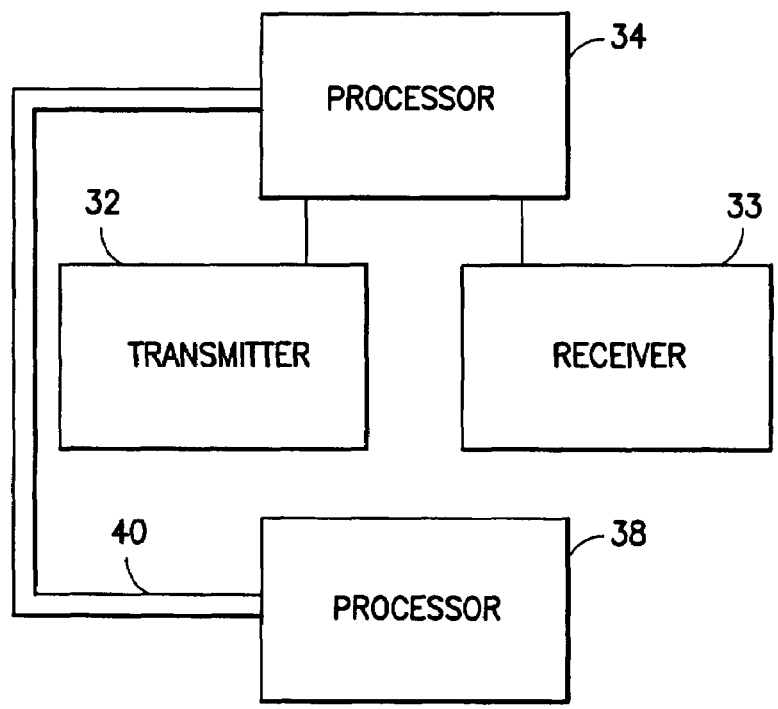
FIG. 3 is a block diagram of the components of the IrDA port and a processor of the meter.
Figure 4:
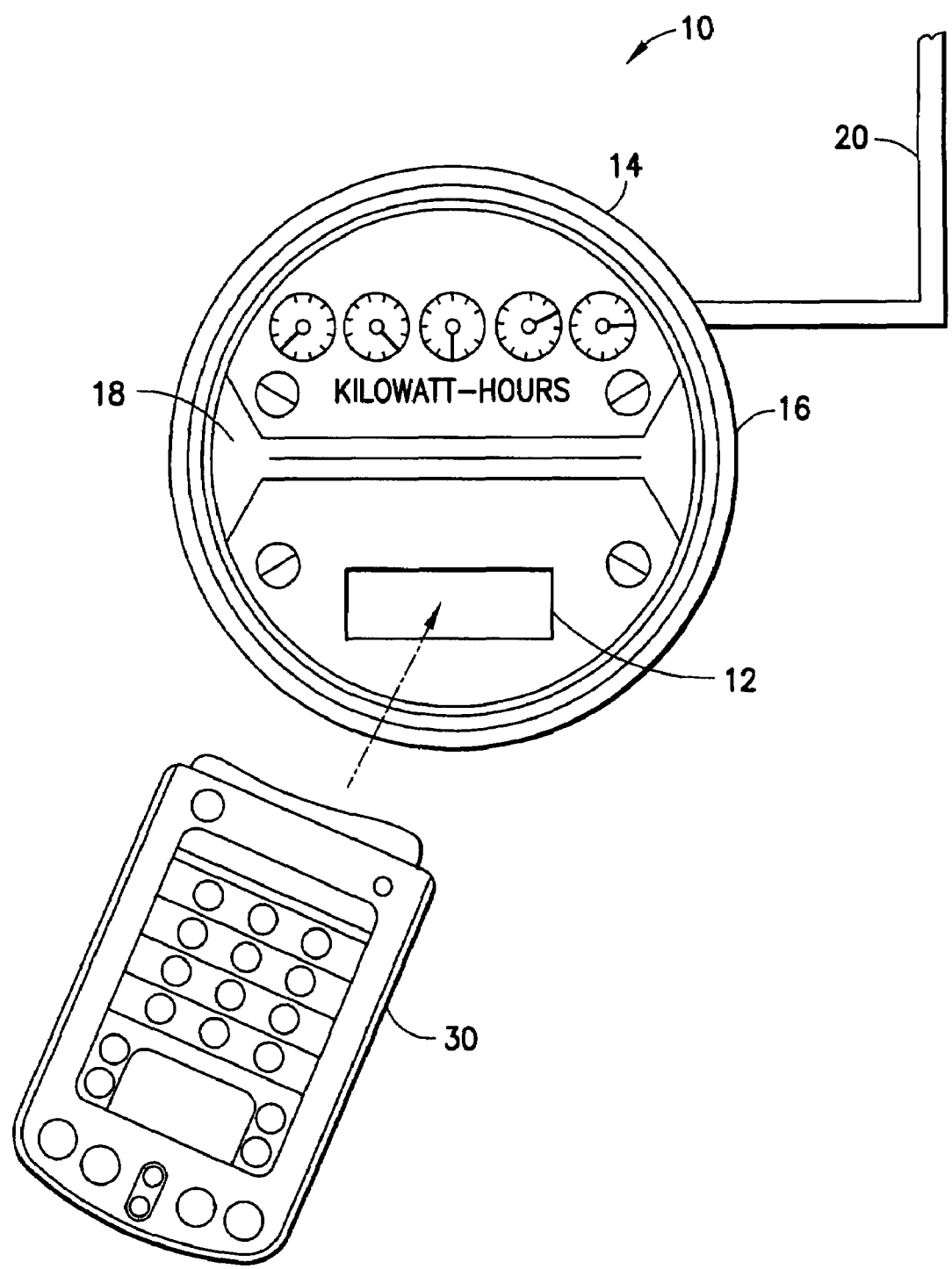
FIG. 4 illustrates a meter reading being performed of the meter shown by FIG. 2 using a handheld computing device.

As shown by FIG. 2, the IrDA port 12 is preferably mounted on the face of the meter 10 to allow data to be read using a handheld computing device 30 (see FIG. 4). As noted above and as shown by FIG. 3, the IrDA port 12 preferably includes components as known in the art, such as a transmitter 32, a receiver 33, and a processor 34 storing programmable instructions for performing the various functions of the IrDA port 12. The processor 34 of the IrDA port 12 is in operative communication with a processor 38 of the meter 10 for transmitting data to the processor 34 of the IrDA port 12 via at least one or more buses 40. The IrDA port 12 is of the type available from, for example, Hewlett-Packard, Inc., Texas Instruments, Inc., and National Semiconductor, Inc.

The IrDA port 12 automatically recognizes the presence of the handheld computing device 30 by intermittently transmitting an optical pulse. If the optical pulse is picked up by the handheld computing device 30, the handheld computing device 30 transmits an acknowledgment pulse. The IrDA port 12 then transmits and receives data to and from the handheld computing device 30. The IrDA port 12 can also manually detect the handheld computing device 30 by manually transmitting an optical pulse from the handheld computing device 30 to the IrDA port 12.

Upon the automatic or manual detection of the handheld computing device 30, the transmitter 32 of the IrDA port 12 automatically transmits data to the handheld computing device 30. The data preferably includes the name and address of the customer, the customer's account number, the amount of energy, current, etc. consumed over a given time period, etc.

For security purposes, it is contemplated for the receiver 33 of the IrDA port 12 to receive a key from the handheld computing device 30 via a transmission packet prior to the transmitter 32 of the IrDA port 12 transmitting data to the handheld computing device 30. If the key does not match a stored key stored within the processor 34 of the IrDA port 12, the transmitter 32 of the IrDA port 12 does not transmit data to the handheld computing device 30.

The handheld computing device 30 is preferably programmed with application software for processing the read data and performing other functions, such as transmitting the security key and automatically detecting the handheld computing device 30. Processed data can then be transmitted either wirelessly or non-wirelessly to a computing device, such as a remote server or personal computer, for preparing bills, statistical charts, energy reports, etc. Alternatively, the handheld computing 30 device stores the read data for transmission to another computing device, such as a server or a personal computer, at a later time.

Data can also be transmitted from the handheld computing device 30 to the IrDA port 12 via one or more of the same IrDA protocols used for transmitting data from the IrDA port 12. The data transmitted to the IrDA port 12 can be used to reprogram and configure the meter 10. The handheld computing device 30 is preferably the Palm Pilot™ available from 3Com Corporation using the Windows CE™ operating system.

Although the subject apparatus has been described with respect to preferred embodiments, it will be readily apparent to those having ordinary skill in the art to which it appertains that changes and modifications may be made thereto without departing from the spirit or scope of the subject apparatus as defined by the appended claims.

What is claimed is:

1. A meter including a first processor for processing at least one measurement, the meter comprising:

an IrDA port for at least wirelessly transmitting data to an optical port of a computing device located at a predetermined distance away from the IrDA port, wherein the IrDA port comprises a second processor in operative communication with the first processor configured for receiving data from the first processor and converting the data to at least one IrDA protocol.

2. The meter according to claim 1, wherein the meter is a power meter and the at least one measurement indicates the amount of power or energy consumed.

3. The meter according to claim 1, wherein the transmitted data includes the at least one measurement.

4. The meter according to claim 1, wherein the transmitted data includes a name, an address, and an account number corresponding to a customer, and an amount of energy consumed over a given time period.

5. The meter according to claim 1, wherein the meter is selected from the group consisting of power, gas, oil, pressure, and water measuring meters.

6. The meter according to claim 1, wherein the at least one IrDA protocol is selected from the group consisting of IrDA Infrared Link Access Protocol (IrLAP), IrDA Infrared Link Management Protocol (IrLMP), IrDA Transport Protocols (Tiny TP), IrDA Object Exchange Protocol (IrOBEX), Extensions to IrOBEX for Ir Mobile Communications, and IrTran-P (Infrared Transfer Picture) Specification.

7. The meter according to claim 1, wherein the IrDA port comprises: means for intermittently transmitting an optical pulse for detecting a computing device; and means for automatically transmitting the data upon the detection of the computing device.

8. The meter according to claim 1, further comprising means for determining whether to wirelessly transmit data via the IrDA port.

9. The meter according to claim 8, wherein the means for determining whether to wirelessly transmit data includes:
means for wirelessly receiving a key via the IrDA port;
means for determining if the key matches a key stores within a memory of the meter; and
means for actuating transmission of the data via the IrDA port if the received key matches the stored key.

10. The meter according to claim 1, wherein the IrDA port comprises means for receiving data to re-program and configure the meter.

11. A power meter for measuring power consumed including a first processor for processing the measured power, the power meter comprising:
an IrDA port for wirelessly transmitting data to an optical port of a computing device located at a predetermined distance away from the IrDA port, wherein the IrDA port comprises a second processor inoperative communication with the first processor configured for receiving the measured power from the first processor and converting the measured power to at least one IrDA protocol.

12. The power meter according to claim 11, wherein the transmitted data includes an amount of power consumed, and a name, an address, and an account number corresponding to a customer.

13. The power meter according to claim 11, wherein the at least one IrDA protocol is selected from the group consisting of IrDA Infrared Link Access Protocol (IrLAP), IrDA Infrared Link Management Protocol (IrLMP), IrDA Transport Protocols (Tiny TP), IrDA Object Exchange Protocol (IrOBEX), Extensions to IrOBEX for Ir Mobile Communications, and IrTran-P (Infrared Transfer Picture) Specification.

14. The power meter according to claim 11, wherein the IrDA port comprises: means for intermittently transmitting an optical pulse for detecting a computing device; and means for automatically transmitting the data upon the detection of the computing device.

15. The power meter according to claim 11, further comprising means for determining whether to wirelessly transmit data via the IrDA port.

16. The power meter according to claim 15, wherein the means for determining whether to wirelessly transmit data includes:
means for wirelessly receiving a key via the IrDA port;
means for determining if the key matches a key stores within a memory of the meter; and
means for actuating transmission of the data via the IrDA port if the received key matches the stored key.

17. The power meter according to claim 11, wherein the IrDA port comprises means for receiving data to re-program and configure the power meter.

18. A meter including a first processor for processing at least one measurement, the meter comprising:
a first optical port for at least wirelessly transmitting data to a second optical port of a computing device located at a predetermined distance away from the first optical port, wherein the first optical port comprises a second processor in operative communication with the first processor configured for receiving data from the first processor and converting the data to at least one transmission protocol.

19. A utility billing system comprising:
at least one meter including a first processor for processing at least one measurement, the at least one meter including an IrDA port for at least wirelessly transmitting data to an optical port of a handheld device located at a predetermined distance away from the IrDA port, wherein the IrDA port comprises a second processor in operative communication with the first processor configured for receiving data from the first processor and converting the data to at least one IrDA protocol;
the handheld device configured for receiving and storing the converted data from the at least one meter and transmitting the converted data to a computing device; and
the computing device configured for receiving the stored data of the at least one meter from the handheld device and for preparing a utility bill for each of the at least one meter based on the received stored data.

20. The system according to claim 19, wherein the at least one meter is a power meter and the at least one measurement indicates the amount of power or energy consumed.

21. The system according to claim 19, wherein the data transmitted from the at least one meter includes a name, an address, and an account number corresponding to a customer, and an amount of energy consumed over a given time period.

22. The system according to claim 19, wherein the at least one meter is selected from the group consisting of power, gas, oil, pressure, and water measuring meters.

23. The system according to claim 19, wherein the at least one IrDA protocol is selected from the group consisting of IrDA Infrared Link Access Protocol (IrLAP), IrDA Infrared Link Management Protocol (IrLMP), IrDA Transport Protocols (Tiny TP), IrDA Object Exchange Protocol (IrOBEX), Extensions to IrOBEX for Ir Mobile Communications, and IrTran-P (Infrared Transfer Picture) Specification.

24. The system according to claim 19, wherein the IrDA port comprises: means for intermittently transmitting an optical pulse for detecting a handheld device; and means for automatically transmitting the data upon the detection of the handheld device.

25. The system according to claim 19, further comprising means for determining whether to wirelessly transmit data via the IrDA port.

26. The system according to claim 19, wherein the means for determining whether to wirelessly transmit data includes:
means for wirelessly receiving a key via the IrDA port;
means for determining if the key matches a key stores within a memory of the at least one meter; and
means for actuating transmission of the data via the IrDA port if the received key matches the stored key.

* * * * *